United States Patent
Gaw et al.

(10) Patent No.: US 10,538,019 B2
(45) Date of Patent: Jan. 21, 2020

(54) COATING SOLUBLE TOOLING INSERTS

(71) Applicant: The Boeing Company, Chicago, IL (US)

(72) Inventors: Kevin O'Brien Gaw, Tukwila, WA (US); Michael Harris Larson, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 268 days.

(21) Appl. No.: 14/720,071

(22) Filed: May 22, 2015

(65) Prior Publication Data

US 2016/0339612 A1 Nov. 24, 2016

(51) Int. Cl.
| | | |
|---|---|---|
| *B29C 43/36* | (2006.01) | |
| *C09D 179/08* | (2006.01) | |
| *B29C 43/02* | (2006.01) | |
| *B29L 23/00* | (2006.01) | |

(52) U.S. Cl.
CPC .............. *B29C 43/36* (2013.01); *B29C 43/02* (2013.01); *C09D 179/08* (2013.01); *B29C 2043/3668* (2013.01); *B29K 2879/08* (2013.01); *B29L 2023/22* (2013.01)

(58) Field of Classification Search
CPC combination set(s) only.
See application file for complete search history.

(56) References Cited

U.S. PATENT DOCUMENTS

| | | | |
|---|---|---|---|
| 5,226,470 A | 7/1993 | Lemoine et al. | |
| 5,470,651 A | 11/1995 | Milinkovic et al. | |
| 6,894,174 B1 * | 5/2005 | Gharavi | C08G 73/10 548/469 |
| 2010/0062188 A1 * | 3/2010 | Miyamoto | C08J 5/18 428/1.6 |
| 2010/0123270 A1 * | 5/2010 | Owens | B29C 33/485 264/318 |
| 2010/0168265 A1 * | 7/2010 | Wu | C08G 73/1042 522/33 |
| 2010/0212816 A1 * | 8/2010 | Schreckenberg | B29C 33/52 156/187 |
| 2011/0168324 A1 * | 7/2011 | Ender | B29C 33/301 156/243 |
| 2013/0022391 A1 * | 1/2013 | Fisher, Jr. | B29C 70/682 403/265 |
| 2013/0039769 A1 * | 2/2013 | Giannozzi | F04D 29/023 416/186 R |
| 2016/0339606 A1 * | 11/2016 | Wallen | B29C 33/52 |

FOREIGN PATENT DOCUMENTS

DE 195 34 836 * 10/1999

OTHER PUBLICATIONS

Machine translation of Roland et al.*
Cassidy et al. "Polyimidines, a new class of polymers. I. Phenylated polypyromellitimidines" (1976).*
Black, "New options for trapped tooling," Compositesworld.com, Gardner Business Media, Inc., Jul. 2011, 7 pages. http://www.compositesworld.com/articles/new-options-for-trapped-tooling.

* cited by examiner

*Primary Examiner* — Austin Murata
(74) *Attorney, Agent, or Firm* — Yee & Associates, P.C.

(57) ABSTRACT

The surface of a tooling insert is coated with a polymer layer having a low surface energy in order to cover surface irregularities and thereby provide a smooth surface against which a composite part may be compression molded.

24 Claims, 6 Drawing Sheets

COATING SOLUBLE TOOLING INSERTS

BACKGROUND INFORMATION

1. Field

The present disclosure generally relates to processes for molding of thermoset or thermoplastic composite parts, and deals more particularly with a coating for soluble tool inserts.

2. Background

Hollow composite parts may be molded by placing composite material over a mandrel-like internal tooling insert that is removed after the composite structure has been molded and has achieved its final material structure. The tooling insert forms a part of a mold assembly and defines the internal shape and surface characteristics of the part. In those applications where the internal portions of the part are not easily accessible and/or has a complex shape, the tooling insert may not be easily withdrawn from the part after solidification and thus becomes "locked" or "trapped" within the part. In these applications, a dissolvable tooling insert may be employed that is formed from a soluble material that can be dissolved in solution. For example, so-called water-soluble tooling inserts may be easily "washed out" of the molded part by immersion of the insert in a water.

One type of tooling insert may be formed of one or more types of ceramic material. Because ceramic inserts have relatively porous surfaces, the insert surface must be covered with a release agent to prevent adherence of the material being formed to the ceramic insert's porous surfaces. Adherence of the material to the porous surface of the insert would result a part having a surface finish that is rough. This is because the uneven porous surface of the insert is effectively transferred to the surface of the formed part. Currently, in order to address this problem, ceramic tooling inserts may be wrapped with a release film such as polyimide film having a pressure sensitive adhesive backing. However, this approach to mold release has several disadvantages. The use of a release film typically results in undesired "mark-off" on the formed part due to variations in the film thickness and the presence of seams between folds and overlaps of the film. The process of applying the film is time-consuming and labor-intensive because of the care that must be taken during hand-wrapping the part. Moreover polyimide film is relatively expensive and therefore adds to molding costs.

Accordingly, there is a need for a coating for soluble ceramic tool inserts that can function as an effective mold release agent and improves surface finish of the finished molded composite parts.

SUMMARY

The disclosed embodiments provide a high temperature mold release coating for a dissolvable tooling insert formed from an inorganic material having a rough or porous surface. The plastic coating fills excrescences and other surface irregularities in the ceramic tooling insert. This allows a finished molded part to be formed with a smooth surface finish. The coating has, preferentially, a low surface tension, allowing it to release from the formed plastic part, allowing easy removal from a part cavity. The coating may be a polyimide that would be suitable for use in high temperature molding operations of thermoplastics and thermosets. The coating applied to the tooling insert should be stable at the temperature of formation of the molded article.

According to one disclosed embodiment, a method is provided of forming a smooth surface on a tooling insert having surface with irregularities, comprising forming a polymer coating on a surface of the tooling insert. The polymer may have a relatively low surface energy and may comprise polyimide. Forming the polymer coating on the surface of the tooling insert includes forming a solution of a polyamic acid, and applying the solution to the surface of the tooling insert. Forming the solution includes introducing at least two monomers into a solvent in predetermined proportions. Forming the solution also includes combining the monomers in a predetermined order to achieve a desired solution concentration. The two monomers may include at least dianhydride and diamine. Application of the solution is performed by one of dipping the tooling insert in the solution, spraying the solution onto the surface of the tooling insert, brushing the solution onto the surface of the tooling insert, and rolling the solution onto the surface of the tooling insert. Applying the solution to the surface of the tooling insert is repeated until the coating has the desired thickness. Coating the surface of the tooling insert further includes removing solvent from the solution by drying. The coating also includes converting the polyamic acid placed on the tool surface to polyimide by heating the mold tool.

According to another disclosed embodiment, a method of compression molding a fiber reinforced plastic part comprises coating a surface of at least one soluble tooling insert with polyimide, and placing the at least one soluble inorganic tooling insert inside a mold tool. The method also includes introducing plastic into the mold tool, applying heat and pressure to the plastic within the mold tool, removing the soluble tooling insert from the mold tool by dissolving the soluble tooling insert, including removing the polyimide from the mold tool, and removing a molded part from the mold tool. The soluble tooling insert is formed of an inorganic material. Coating the surface of the tooling insert includes preparing a solution of polyamic acid in a solvent, and applying the solution to the surface of the soluble tooling insert. Applying the solution to the surface of the soluble tooling insert is performed by one of dipping the soluble tooling insert in the solution, spraying the solution onto the surface of the soluble tooling insert, brushing the solution onto the surface of the soluble tooling insert, and rolling the solution onto the surface of the soluble tooling insert. The method may further comprise forming a coating by removing the solvent from the solution, including drying the solution after applying the solution to the surface of the soluble tooling insert. The drying adheres the coating to the surface of the soluble tooling insert. Adhering the coating includes heating the water soluble tooling insert either before or after the water soluble tooling insert is placed into the mold tool. The method also includes removing the polyimide from the mold tool after the tooling insert has been removed.

According to still another disclosed embodiment, a mold release agent is provided for a tool having a porous surface, comprising a polymer coating forming a smooth surface over the mold surface.

According to a further disclose embodiment, a dissolvable tooling insert adapted to be placed inside a mold tool for forming a cavity in a molded part, comprises a ceramic body formed of a soluble porous material, and a smooth continuous polymer coating on the tooling insert for imparting an aerodynamically smooth finish on the part.

According to still another embodiment, a method is provided of making a thermoplastic composite part having an finish. The method comprises forming a water soluble inorganic tooling insert having surface irregularities, and forming a smooth outer finish on the part by forming a polymer coating on the tooling insert that covers the surface irregularities. The method further includes molding the part of the tooling insert, including heating a thermoplastic mold charge to a melt temperature of the thermoplastic mold charge. The method also includes removing the tooling insert from the part by dissolving the mold insert using a water solution, and removing the polymer coating from the part. Heating the thermoplastic mold charge includes heating the thermoplastic mold charge to a temperature of approximately 725° F. Applying the polymer coating includes forming a polyimide coating on the inorganic mold insert The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

Figure 1:
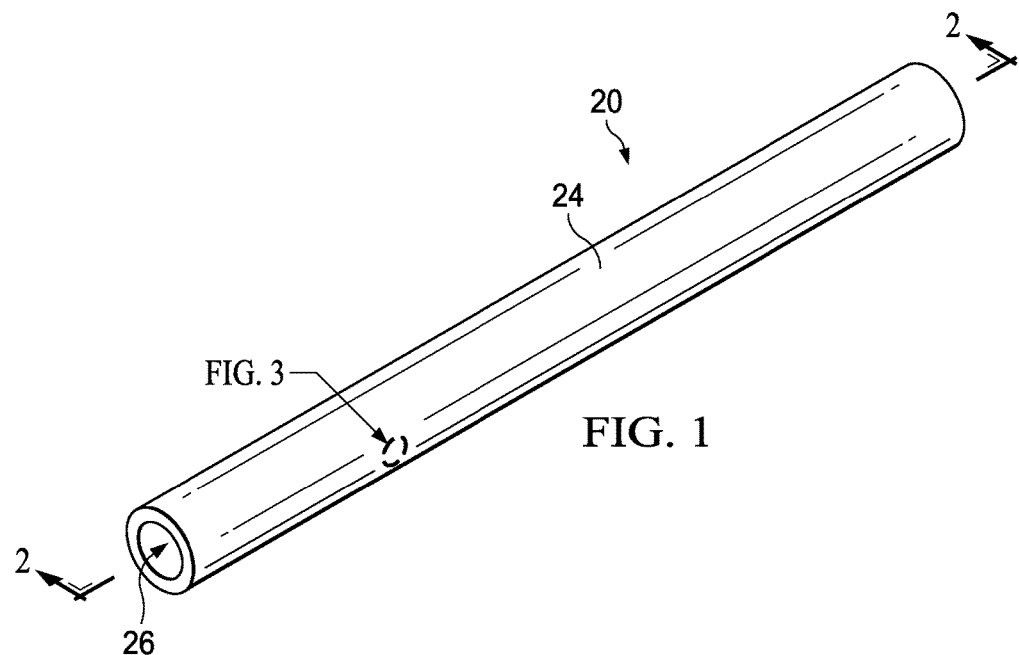
FIG. 1 is an illustration of a perspective view of a composite part produced using an internal soluble tooling insert.
Figure 2:
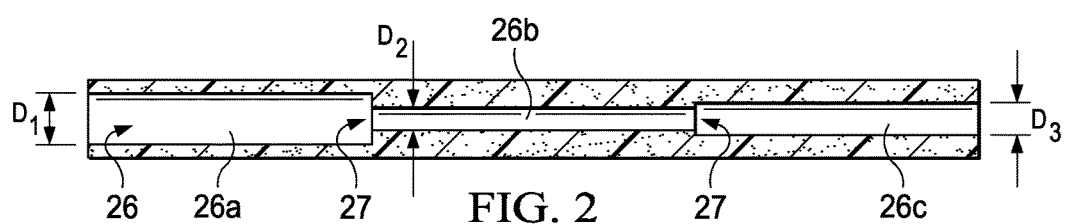
FIG. 2 is a sectional view taken along the line 2-2 in FIG. 1.

Referring first to FIGS. 1-6, a composite plastic part 20, such as a tube 20 (FIG. 1), may be molded in a heated mold tool 36 (FIG. 5) using a compression molding press 22. The mold tool 36 is compressed between upper and lower heated platens 32, 34 of the compression molding press 22. Although a simple compression molding press 22 is illustrated, the disclosed embodiments may be employed in connection with other types of molding processes, including but not limited to continuous compression molding or extrusion. Moreover, the disclosed embodiments may be employed to produce composite plastic parts, including fiber reinforced laminate parts, using any of a variety of other manufacturing processes, including but not limited to, injection molding.

Figure 3:
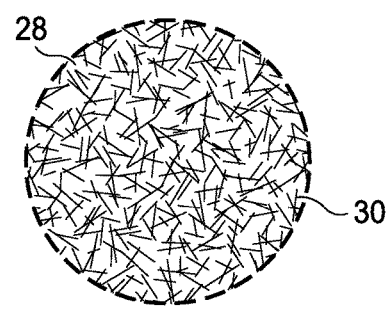
FIG. 3 is an illustration of the area designated as FIG. 3 in FIG. 1.
Figure 4:
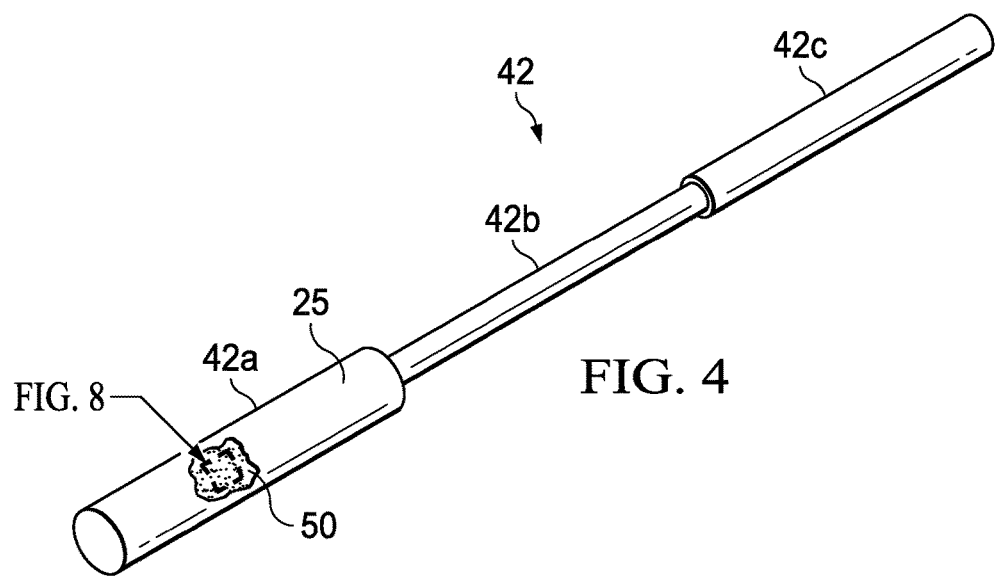
FIG. 4 is an illustration of a perspective view of the soluble tooling insert, wherein a portion of a mold release coating has been broken away to reveal the porous surface of the tooling insert.
Figure 6:
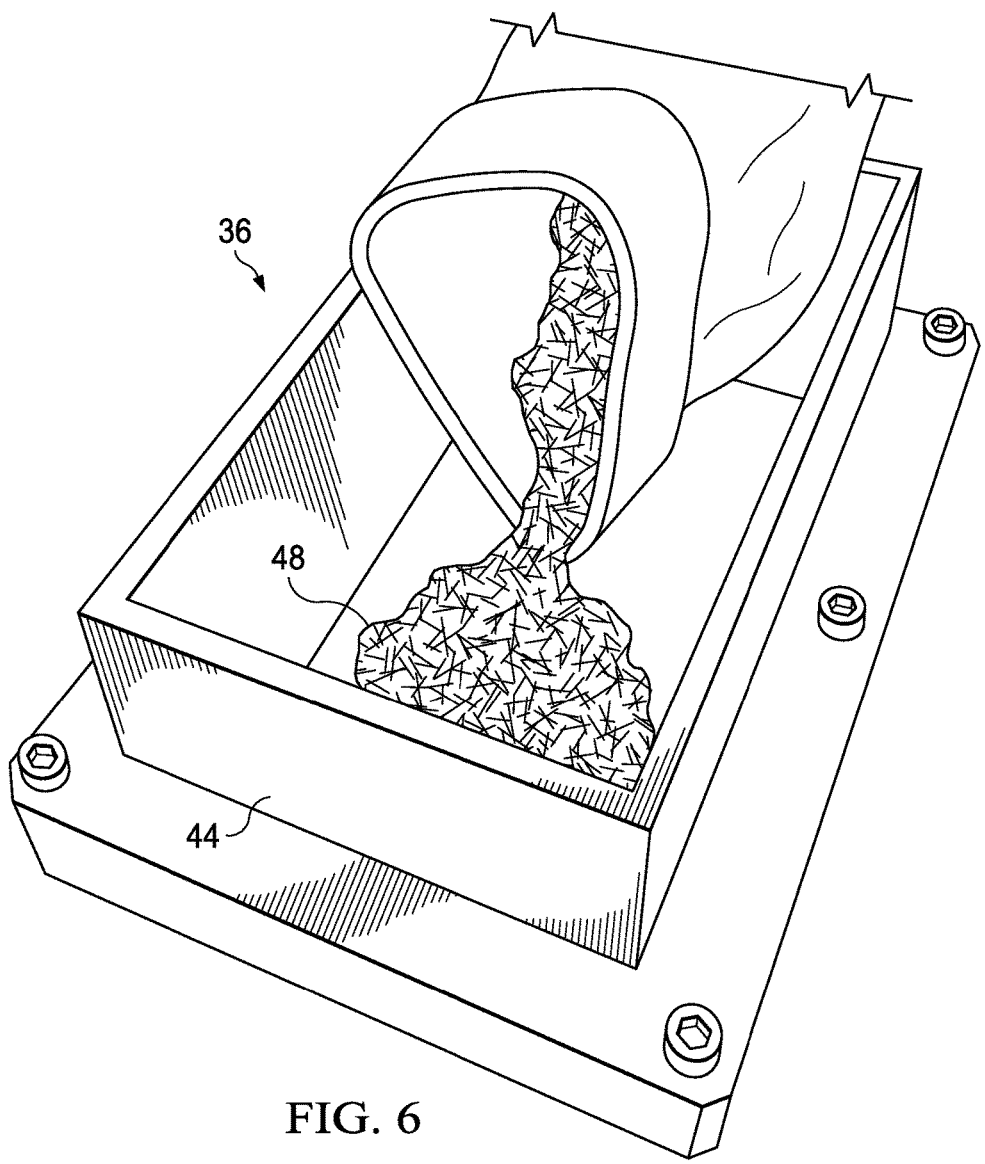
FIG. 6 is an illustration of a perspective view showing fiber reinforced thermoplastic flakes being loaded into a portion of a mold tool.

The illustrated tube 20 is of a unitary, molded construction, comprising a cylindrical body 24 having an axial bore 26. The axial bore 26 may include sections 26a, 26b, 26c, respectively having different diameters $D_1$, $D_2$, $D_3$ that form internal steps 27 along the length of the axial bore 26. As shown in FIG. 3, the tube 20 comprises a thermoplastic resin 28 formed from plastic containing, fiber-filled flakes 48 (FIG. 6). The resulting molded part 20 randomly orients the chopped fibers 30. The disclosed embodiments may be employed to fabricate parts and structures having "trapped volumes" formed of a variety of plastics, such as thermosets having various types of reinforcements, including various forms of continuous reinforcements. The tube 20 is merely exemplary of a wide range of parts and structures that may be fabricated using tooling inserts having a coating according to the disclosed embodiments. Additionally, the disclosed embodiments may be employed to fabricate a variety of fiber reinforced plastic laminates, including but not limited to thermoplastic and thermoset laminates.

Figure 5:
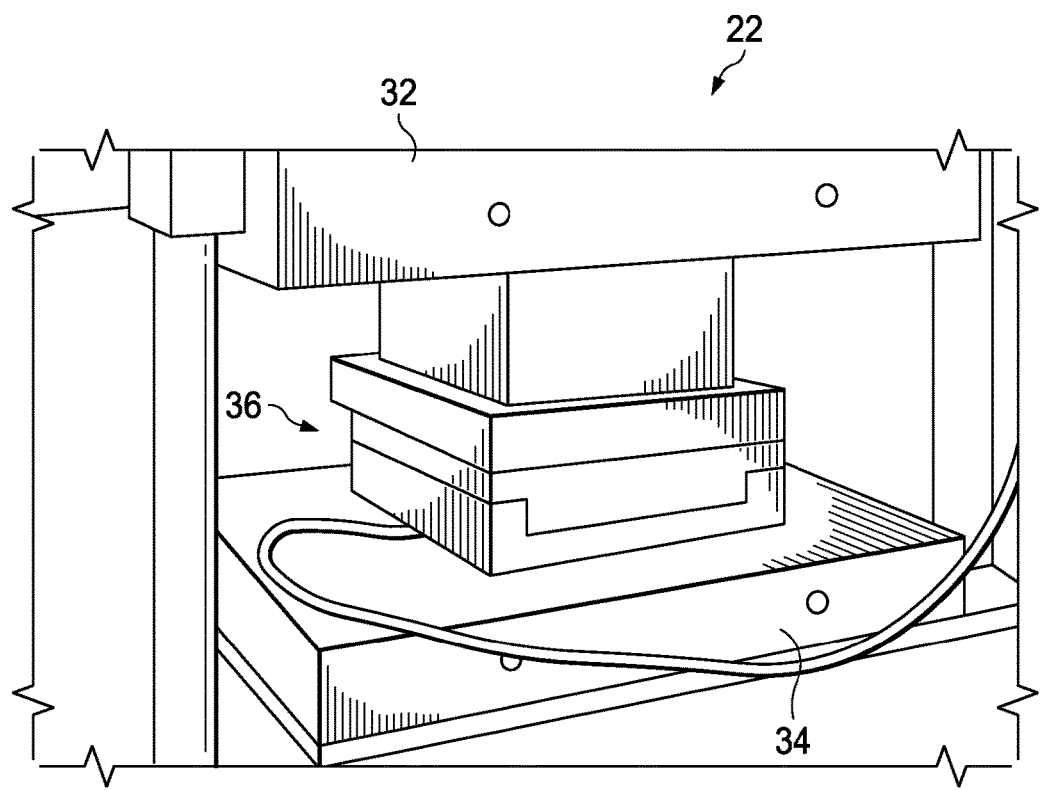
FIG. 5 is an illustration of a perspective view of a compression molding press used to compression mold the part shown in FIG. 1.

Referring to FIGS. 4-7, the mold tool 36 comprises a lower mold portion 38, and an upper mold portion 40 (FIG. 5). As best seen in FIG. 6, the mold tool 36 includes a hopper-like upper section 44 that is adapted to be filled with a mold charge, which in the illustrated example, comprises chopped flakes of unidirectional, carbon fiber reinforced tape 48. The mold charge may comprise other types fiber reinforced plastics, depending on the application.

A tooling insert 42 (FIGS. 4 and 7a) is positioned inside the mold tool 36 for molding the internal axial bore 26 in the tube 20. The tooling insert 42 include sections 42a, 42b 42c that substantially match the size and features of the axial bore 26. It may be appreciated from the geometry of the axial bore 26 that, following molding of the part 20, the tooling insert 42 cannot not be withdrawn from the part 20 due to the steps (FIG. 2) which effectively lock the tooling insert 42 inside the part 20. Accordingly, the tooling insert 42 is formed of a soluble material that can be dissolved after the part 20 is molded. The surface 50 of tooling insert 42 is provided with a non-porous temperature resistant mold release coating 25 forming a smooth, uninterrupted tool surface for imparting a smooth surface finish to the formed part 20.

Figure 7A:
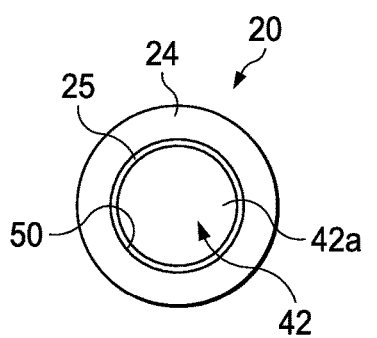
FIG. 7a is an illustration of an end view of the molded part shown in FIG. 1 before removal of the tooling insert.
Figure 7B:
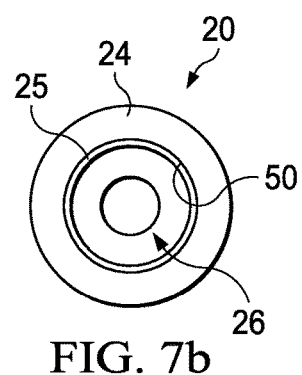
FIG. 7b is an illustration similar to FIG. 7a, but showing the tooling insert having been dissolved, and the polymer coating remaining on the part.
Figure 7C:
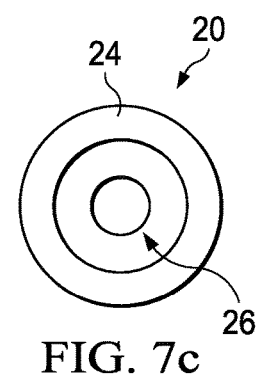
FIG. 7c is an illustration similar to FIG. 7b but showing the polymer coating having been removed from the surface of the molded part.

FIG. 7a illustrates the tooling insert 42 locked within the part 20 following molding of the tube 20. FIG. 7b shows the tube 20 after the tooling insert 42 has been dissolved, and FIG. 7c shows the tube 20 after the mold release coating 25 has been removed from the axial bore 26.

Figure 8:
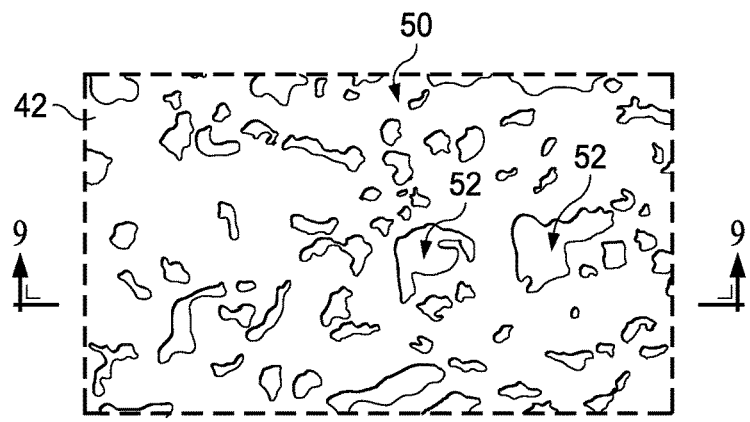
FIG. 8 is an illustration of the area designated as FIG. 8 in FIG. 4.
Figure 9:
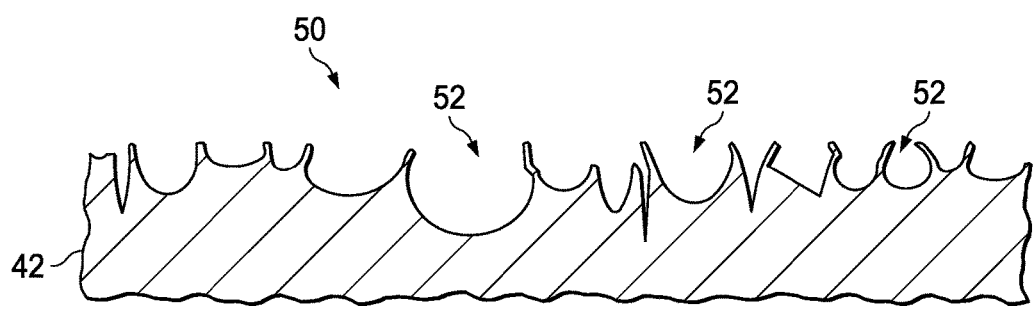
FIG. 9 is an illustration of a sectional view taken along the line 9-9 in FIG. 8, better illustrating the rough, porous surface of the tooling insert.
Figure 10:
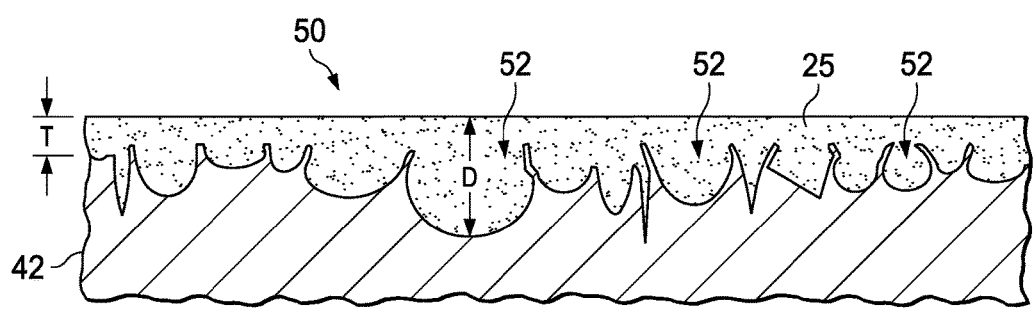
FIG. 10 is an illustration similar to FIG. 9 but showing a coating applied over the surface of the tooling insert.

Attention is now directed to FIGS. 8-10 which illustrate additional details of one of the tooling inserts 42. The tooling inserts 42 are formed of a soluble inorganic material, and may be produced by any suitable technique, including without limitation, molding, machining or additive manufacturing. The tooling inserts 42 may have surface irregularities forming a relatively rough surface 50. For example, in the case of a ceramic tooling insert 42, the surface 50 may be porous and include random open porosities and crevices 52. Thus, as used herein, "surface irregularities" or excrescent features may include but are not limited to porosity, gaps, crevices, cracks, asperities, unevenness or other similar surface features which may be imparted to and adversely affect the surface finish of the molded part 20. According to the disclosed embodiments, in order to provide the tooling insert 42 with a smooth surface 50, substantially free of surface irregularities, a mold release coating 25 is applied to the surface 50. The mold release coating 25 fills the porosities and crevices 52, and any other surface irregularities in the surface 50. The coating 25 may comprise a layer of material having a thickness "T" that will depend upon the particular application, and specifically a reduction of the surface roughness 50. Generally, as a minimum, the thickness "T" of the mold release coating 25 should be at least equal to the maximum depth "D" of the surface irregularities in the surface 50, such as the depth of the open porosity and/or crevices 52.

As will be discussed later in more detail, the mold coating 25 should comprise a material capable of withstanding the temperatures of the mold tool and molten plastic material. For example, and without limitation, in the case of a thermoplastic part, the coating 25 should be able to withstand temperatures at which molding is carried out, for example and without limitation, compression molding at approximately 725° F., without substantial physical transformation or degradation to the coating. The coating 25 should also be compatible with the material from which the tooling insert 42 is formed, and preferably have a relatively low surface energy, resulting in a relatively low surface tension. "Low surface energy", as used herein, means a surface energy that is low enough relative to the surface energy of the molded part to result in a relatively low level of surface interfacial adherence. The relatively low surface tension of the coating 25 reduces the level of adhesion between the coating 25 and the formed part. The reduced level of adhesion due to the relatively low surface tension allows the mold release coating 25 to be easily removed from the molded part after the tooling insert 42 is dissolved or "washed out", as will be explained below. In one embodiment, for example and without limitation, the coating 25 may comprise polyimide.

Figure 11:
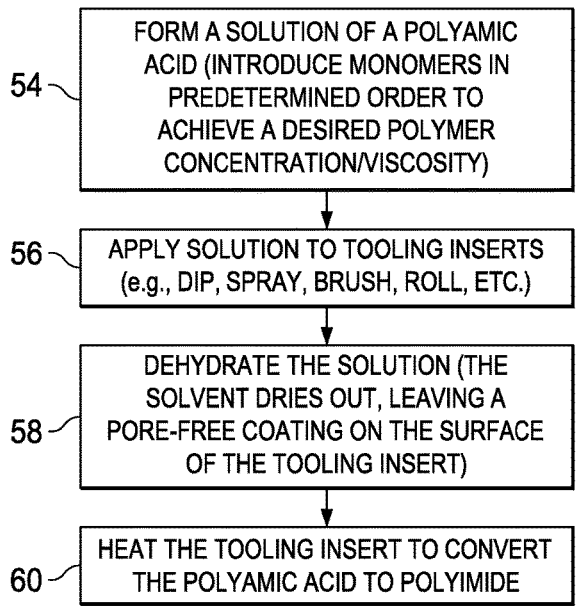
FIG. 11 is an illustration of a flow diagram of a method of coating a tooling insert.
Figure 12:
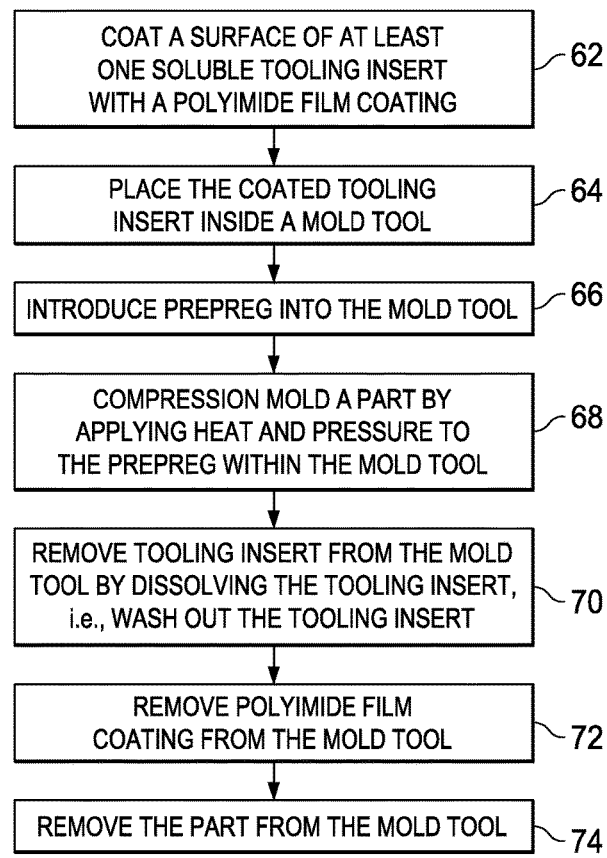
FIG. 12 is an illustration of a flow diagram of a method of compression molding a part using a dissolvable tooling insert having a polymer coating and a polymeric precursor mold material.

Attention is now directed to FIG. 11 which broadly illustrates a method of coating the surface of a tooling insert 42 with a polymer material that acts as a mold release agent. At 54, a liquid solution is formed comprising a polyamic acid. The polyamic acid is formed by introducing at least two monomers in a predetermined order, and in predetermined proportions in order to achieve a desired concentration of the monomer in the solution. In one embodiment, the two monomers may comprise, respectively dianhydride and diamine, however, other monomers are possible. The solvent may comprise, for example and without limitation, dimethylacetamide. The concentration of the monomers added to the solvent will determine the viscosity of the solution. The desired viscosity will depend upon the concentration of the polymer and the solvent. The thickness "T" of the coating will result from the content of polymer in solution and the number of applications of the solution to the surface of the tooling insert 42. Higher solution viscosities result in a coating 25 having a greater thickness "T".

Next, at 56, the solution is applied to one or more surfaces of the tooling inserts 42. The application process may be performed using any of various techniques, including but not limited to dipping the tooling inserts 42 in the solution, or spraying the solution, or brushing or rolling the solution onto surfaces of the tooling inserts 42. Next, as shown at 58, the solution applied to the tooling inserts 42 is dried (dehydrated) by any suitable means, including allowing the solution to air dry. As a result of the drying, the solvent leaves the coating resulting in a pore-free coating on the surface of the tooling insert 42. At 60, the tooling inserts 42 are heated to a temperature that is sufficient to convert the polyamic acid to polyimide. This process is sometimes referred to as polymerization. The temperature to which the tooling inserts 42 must be heated will depend on the application. The tooling inserts 42 may be heated, after coating, before they are placed in a mold tool 36, or after they are placed in the mold tool 36 by heating the mold tool 36. This can be accomplished by thermal treatment prior to conducting a molding operation. The polymer coating 25 that has been formed on the tooling insert 42 is smooth and uninterrupted, resulting in a similarly smooth, uninterrupted surface being formed on the final molded part surface.

Figure 13:
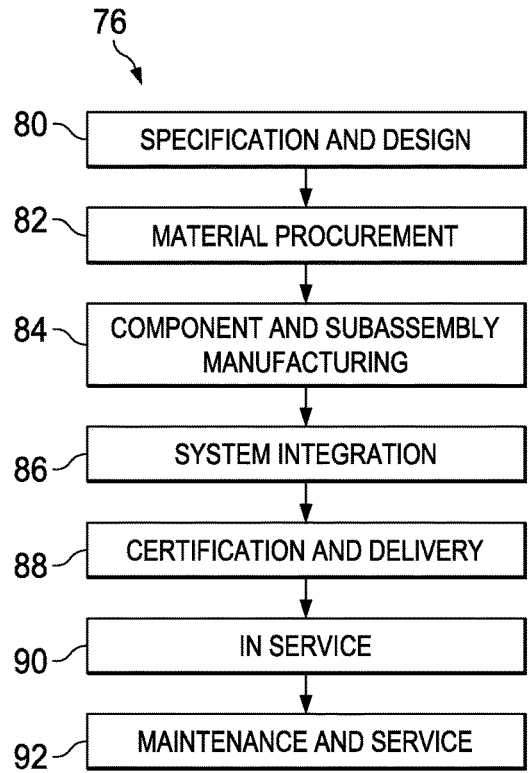
FIG. 13 is an illustration of a flow diagram of aircraft production and service methodology.

FIG. 13 broadly illustrates the steps of a method of compression molding a fiber reinforced plastic part 20 having an internal cavity formed by a tooling insert 42 or mandrel. Beginning at 62, one or more surfaces of at least one soluble tool insert are coated 25. At 64 the coated tooling insert 42 is placed inside a mold tool 36. Then, at 66, a mold charge comprising prepreg 48 is introduced into the mold tool 36. At 68, a part 20 is compression molded by applying heat and pressure to the prepreg 48 within the mold tool 36. The applied pressure compresses the mold charge against the tooling insert 42 (see FIG. 7a), forming the desired internal surfaces (bores 26a, 26b, 26c) within the part 20. At 70, the tooling insert 42 is removed from the mold tool 36 (see FIG. 7b) by dissolving the tool insert 42. The tooling insert 42 is dissolved by subjecting it to a solution such as water, which optionally, may be applied under pressure.

The soluble tool insert 42 dissolves when contacted by the water, allowing the tooling insert 42 to be washed out of the part cavity 35. At 72, the coating can be removed from the mold by washing or peeling away from the mold tool 36. Because of the coating's preferred low surface tension, the coating 25 easily releases from the molded part 20. In some applications, the coating 25 may be removed concurrently with the tooling insert 42 in step 70. Water pressure used to wash out the tooling insert 42 can be strong enough to cause the coating 25 to release from the part 20 (see FIG. 7c) without damage to the molded part. If necessary, after the tooling insert 42 and the coating 25 are removed, then at step 74, the part 20 may be removed from the mold tool 36.

Figure 14:
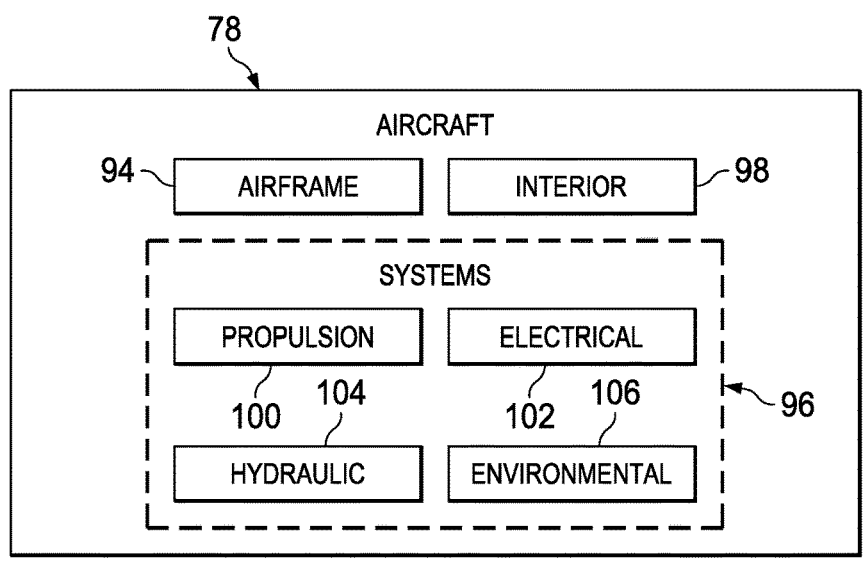
FIG. 14 is an illustration of a block diagram of an aircraft.

Embodiments of the disclosure may find use in a variety of potential applications, particularly in the transportation industry, including for example, aerospace, marine, automotive applications and other application where composite parts are molded using tooling inserts to form cavities. Thus, referring now to FIGS. 14 and 15, embodiments of the disclosure may be used in the context of an aircraft manufacturing and service method 76 as shown in FIG. 14 and an aircraft as shown in FIG. 15. During pre-production, exemplary method 76 may include specification and design 80 of the aircraft 78 and material procurement 82. During production, component and subassembly manufacturing 84 and system integration 86 of the aircraft 78 takes place. Thereafter, the aircraft 78 may go through certification and delivery 88 in order to be placed in service 90. While in service by a customer, the aircraft 78 is scheduled for routine maintenance and service 92, which may also include modification, reconfiguration, refurbishment, and so on.

Each of the processes of method 76 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 15, the aircraft 78 produced by exemplary method 76 may include an airframe 94 with a plurality of systems 96 and an interior 98. Examples of high-level systems 96 include one or more of a propulsion system 100, an electrical system 102, a hydraulic system 104, and an environmental system 106. Any number of other systems may be included. Although an aerospace example is shown, the principles of the disclosure may be applied to other industries, such as the marine and automotive industries.

Systems and methods embodied herein may be employed during any one or more of the stages of the production and service method 76. For example, components or subassemblies corresponding to production process 84 may be fabricated or manufactured in a manner similar to components or subassemblies produced while the aircraft is in service. Also, one or more apparatus embodiments, method embodiments, or a combination thereof may be utilized during the production stages 84 and 86, for example, by substantially expediting assembly of or reducing the cost of an aircraft 78. Similarly, one or more of apparatus embodiments, method embodiments, or a combination thereof may be utilized while the aircraft 78 is in service, for example and without limitation, to maintenance and service 92.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of forming a thermoplastic composite aerospace part having a smooth surface on a tooling insert having surface irregularities, comprising:
   forming a polyamic acid solution;
   applying the polyamic acid solution to a surface of the tooling insert;
   forming a polyimide coating on a surface of the tooling insert by heating the tooling insert;
   forming the thermoplastic composite aerospace part around the tooling insert;
   removing the tooling insert from the aerospace part by dissolving the tooling insert; and
   removing the polyimide coating from the aerospace part, after the tooling insert has fully dissolved.

2. The method of claim 1, wherein the polyimide has low surface energy relative to the thermoplastic composite part.

3. The method of claim 1, wherein forming the polyamic acid solution includes introducing at least two monomers into a solvent in predetermined proportions.

4. The method of claim 3, wherein coating the surface of the tooling insert further includes removing the solvent from the coating by drying.

5. The method of claim 1, wherein forming the polyamic acid solution includes combining at least two monomers in a predetermined order to achieve a desired concentration of the polymer in the solution.

6. The method of claim 5, wherein combining the at least two monomers include combining at least dianhydride and diamine.

7. The method of claim 1, wherein applying the polyamic acid solution is performed by one of:
   dipping the tooling insert in the solution,
   spraying the solution onto the surface of the tooling insert;
   brushing the solution onto the surface of the tooling insert; and
   rolling the solution onto the surface of the tooling insert.

8. The method of claim 1, wherein forming the polyamic acid solution is performed using monomers.

9. The method of claim 1, wherein applying the polyamic acid solution to the surface of the tooling insert is repeated until the coating has a desired thickness.

10. A method of compression molding a fiber reinforced plastic aerospace part, comprising:
    coating a surface of at least one soluble tooling insert with a polyamic acid solution;
    placing the at least one soluble tooling insert inside a mold tool;
    introducing plastic into the mold tool;
    applying heat and pressure to the plastic within the mold tool;
    removing the soluble tooling insert from the mold tool by dissolving the soluble tooling insert;
    removing a polyimide coating formed from the polyamic acid solution after the soluble tooling insert has completely dissolved; and
    removing a molded aerospace part from the mold tool.

11. The method of claim 10, wherein the soluble tooling insert is formed of an inorganic material, and coating the surface of the tooling insert includes:
    preparing a solution of polyamic acid in a solvent; and
    applying the solution to the surface of the soluble tooling insert.

12. The method of claim 11, wherein applying the solution to the surface of the soluble tooling insert is performed by one of:
dipping the soluble tooling insert in the solution;
spraying the solution onto the surface of the soluble tooling insert;
brushing the solution onto the surface of the soluble tooling insert; and
rolling the solution onto the surface of the soluble tooling insert.

13. The method of claim 11, further comprising:
forming the coating by removing the solvent from the solution, including drying the solution after applying the solution to the surface of the soluble tooling insert; and
adhering the coating to the surface of the soluble tooling insert.

14. The method of claim 13, wherein adhering the coating includes heating the soluble tooling insert.

15. The method of claim 14, wherein heating the soluble tooling insert is performed before placing the soluble tooling insert into the mold tool.

16. The method of claim 14, wherein heating the soluble tooling insert is performed after the tooling insert is inserted into the mold tool, and includes heating the mold tool.

17. The method of claim 13, wherein the soluble tooling insert is water soluble, and the method further comprises:
wherein removing the soluble tooling insert from the mold tool includes dissolving the soluble tooling insert with water.

18. A method of making a thermoplastic composite aerospace part having an aerodynamic finish, comprising:
forming a water-soluble inorganic tooling insert having surface irregularities;
coating the tooling insert with a polyamic acid solution that covers the surface irregularities;
forming a smooth outer finish on the tooling insert by evaporating a solvent from the polyamic acid solution;
molding the aerospace part on the tooling insert, including heating a thermoplastic mold charge to a melt temperature of the thermoplastic mold charge;
removing the tooling insert from the aerospace part by dissolving the tooling insert; and
removing a polyimide coating formed from the polyamic acid solution from the aerospace part, after the tooling insert has fully dissolved.

19. The method of claim 18, wherein heating the thermoplastic mold charge includes heating the thermoplastic mold charge to a temperature of approximately 725° F.

20. The method of claim 18, further comprising forming the polyamic acid solution, including introducing at least two monomers into a solvent in predetermined proportions.

21. The method of claim 20, wherein forming the polyamic acid solution includes combining at least two monomers in a predetermined order to achieve a desired concentration of the polymer in the solution.

22. The method of claim 21, wherein combining the at least two monomers include combining at least dianhydride and diamine.

23. The method of claim 18, wherein coating the tooling insert with the polyamic acid solution is performed by one of:
dipping the tooling insert in the solution,
spraying the solution onto the surface of the tooling insert;
brushing the solution onto the surface of the tooling insert; and
rolling the solution onto the surface of the tooling insert.

24. The method of claim 18, wherein applying the polyamic acid solution to the surface of the tooling insert is repeated until the coating has a desired thickness.

* * * * *